US008453116B2

(12) United States Patent
Logozzo et al.

(10) Patent No.: US 8,453,116 B2
(45) Date of Patent: May 28, 2013

(54) EFFICIENT INVARIANT INFERENCE FOR PROGRAM VERIFICATION

(75) Inventors: Francesco Logozzo, Bellevue, WA (US); Vincent Laviron, Labege (FR)

(73) Assignee: Microsoft Corporation, Redmond, WA (US)

( * ) Notice: Subject to any disclaimer, the term of this patent is extended or adjusted under 35 U.S.C. 154(b) by 1220 days.

(21) Appl. No.: 12/277,175

(22) Filed: Nov. 24, 2008

(65) Prior Publication Data

US 2010/0131929 A1    May 27, 2010

(51) Int. Cl.
    *G06F 9/44*    (2006.01)
(52) U.S. Cl.
    USPC .......................................... 717/126; 717/120
(58) Field of Classification Search
    USPC .................................................. 717/120, 126
    See application file for complete search history.

(56) References Cited

U.S. PATENT DOCUMENTS

| | | | |
|---|---|---|---|
| 6,570,522 B1 * | 5/2003 | Galambos et al. | 341/155 |
| 6,950,844 B2 | 9/2005 | Walster et al. | |
| 7,039,219 B2 | 5/2006 | Liu | |
| 7,076,397 B2 | 7/2006 | Ding | |
| 7,167,849 B2 | 1/2007 | Graepel | |
| 7,184,993 B2 | 2/2007 | Heckerman | |
| 7,337,204 B2 | 2/2008 | Dor | |
| 2003/0131034 A1 | 7/2003 | Walster | |
| 2005/0010897 A1 * | 1/2005 | Ogawa et al. | 717/106 |
| 2006/0149803 A1 * | 7/2006 | Siu et al. | 708/501 |
| 2006/0236311 A1 * | 10/2006 | Chang et al. | 717/151 |
| 2008/0082968 A1 * | 4/2008 | Chang et al. | 717/128 |
| 2008/0313596 A1 * | 12/2008 | Kreamer et al. | 717/101 |
| 2010/0198369 A1 * | 8/2010 | Brooks et al. | 700/33 |

OTHER PUBLICATIONS

Verbeek, H.M.W; "On the Verification of EPCs using T-invariants"; 2006; pp. 1-20; http://is.tm.tue.nl/staff/wvdaalst/BPMcenter/reports/2006/BPM-06-05.pdf.
Ye, Lexiang; "The Asymmetric Approximate Anytime Join: A New Primitive with Application to Data Mining"; 2008; pp. 363-374; http://www.siam.org.proceedings/datamining/2008/dm08_33_Ye.pdf.
Govindaraju, Shankar G.; "Verification by Approximate Forward and Backward Reachability"; 1998; pp. 1-5; http://delivery.acm.org/10.1145/290000/289055/p366-govindaraju.pdf? key1=289055&key2=3256371221&coll=GUIDE&CFID=3160335&CFTOKEN=44114062.

(Continued)

*Primary Examiner* — Li B Zhen
*Assistant Examiner* — Bradford Wheaton
(74) *Attorney, Agent, or Firm* — Workman Nydegger

(57) ABSTRACT

In one embodiment, a computer system identifies a portion of software code that is to be verified using invariants. The computer system infers invariants from the software code portion at a join point. The linear inequalities of the invariants include a first abstract domain that includes linear equalities among variables, and a second, different abstract domain that includes intervals for variables. The computer system selects variables that are to be applied within the linear inequalities to form a linear equality and an interval based on the linear inequality and performs a reduction operation on the variables to determine the substantially tightest numerical bounds for the variable's interval. The computer system also performs a join operation of the first and second abstract domains, where the join results in a precise abstraction of various possible software program states at the join point in the software program.

18 Claims, 3 Drawing Sheets

OTHER PUBLICATIONS

Barnett, Mike; "Foxtrot and Clousot: Language Agnostic Dynamic and Static Contract Checking for .NET"; Aug. 2008; p. 1; http://www.research.microsoft.com/apps/pubs/default.aspx?id=70614.

Chvatal, Vasek; "Linear Programming"; 1983; W.H. Freeman and Company; United States of America.

Cousot, Patrick; "The Calculational Design of a Generic Abstract Interpreter"; 1999; NATO ASI Series F. IOS Press.

Karr, Michael; "Affine Relationships Among Variables of a Program"; Jul. 1976; pp. 133-151; http://www.springerlink.com/content/xr82244566850478/.

Mine, Antoine; "A Few Graph-Based Relational Numerical Abstract Domains"; Mar. 16, 2007; pp. 1-20; Paris, France.

Laviron; Vincent; "SubPolyhedra: A (more) Scalable Approach to Infer Linear Inequalities"; 2009; pp. 1-15; http://research.microsoft.com/pubs/78027/vmcai09.pdf.

* cited by examiner

EFFICIENT INVARIANT INFERENCE FOR PROGRAM VERIFICATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks. For example, word processor applications are designed for drafting documents, just as email programs are designed for sending, receiving and organizing email.

In many cases, software applications are quite complex, incorporating many different modules, functions and components, each designed to play a part in providing some portion of desired functionality. This complexity often leads to programming deficiencies, often referred to as "bugs" in the software applications. In most cases, these deficiencies are discovered during the software development process or when the application is tested by a software tester or software testing computer program. Such testing is often time consuming and resource intensive.

In some cases, however, software applications (or portions thereof) may be logically or mathematically verified before being sent out for formal testing. Such program verification may be performed using various known algorithms and approximations. In this manner, a developer or tester may determine that a software application is functioning correctly, or, at least that the application complies with the developer's general conception of how the application is supposed to function. Such application verification often involves the use and/or discovery of program invariants. Existing methods of discovering program invariants typically incorporate exponential expressions which thereby limits the number of variables that can be in the software application. A high number of variables in the software application tends to bog down or completely halt the inference of invariants.

BRIEF SUMMARY

Embodiments described herein are directed to inferring invariants used to verify that a software program satisfies a program specification. In one embodiment, a computer system identifies a portion of software code that is to be verified using invariants. The invariants are at least partially inferred from the semantics of the software code portion and the invariants include linear inequalities. The computer system infers invariants from the software code portion at a join point. The linear inequalities of the invariants include a first abstract domain and a second, different abstract domain. The first abstract domain includes linear equalities among variables, and the second abstract domain including intervals for variables.

The computer system selects variables that are to be applied within the linear inequalities to form a linear equality and an interval based on the linear inequality. The computer system performs a reduction operation on the variables to determine the substantially tightest numerical bounds for the variable's interval, such that the most precise values for the linear equalities at the join point can be determined. The computer system also performs a join operation of the first and second abstract domains including the linear equality with the selected variable and the determined interval for the variable, where the join results in a precise abstraction of various possible software program states at the join point in the software program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
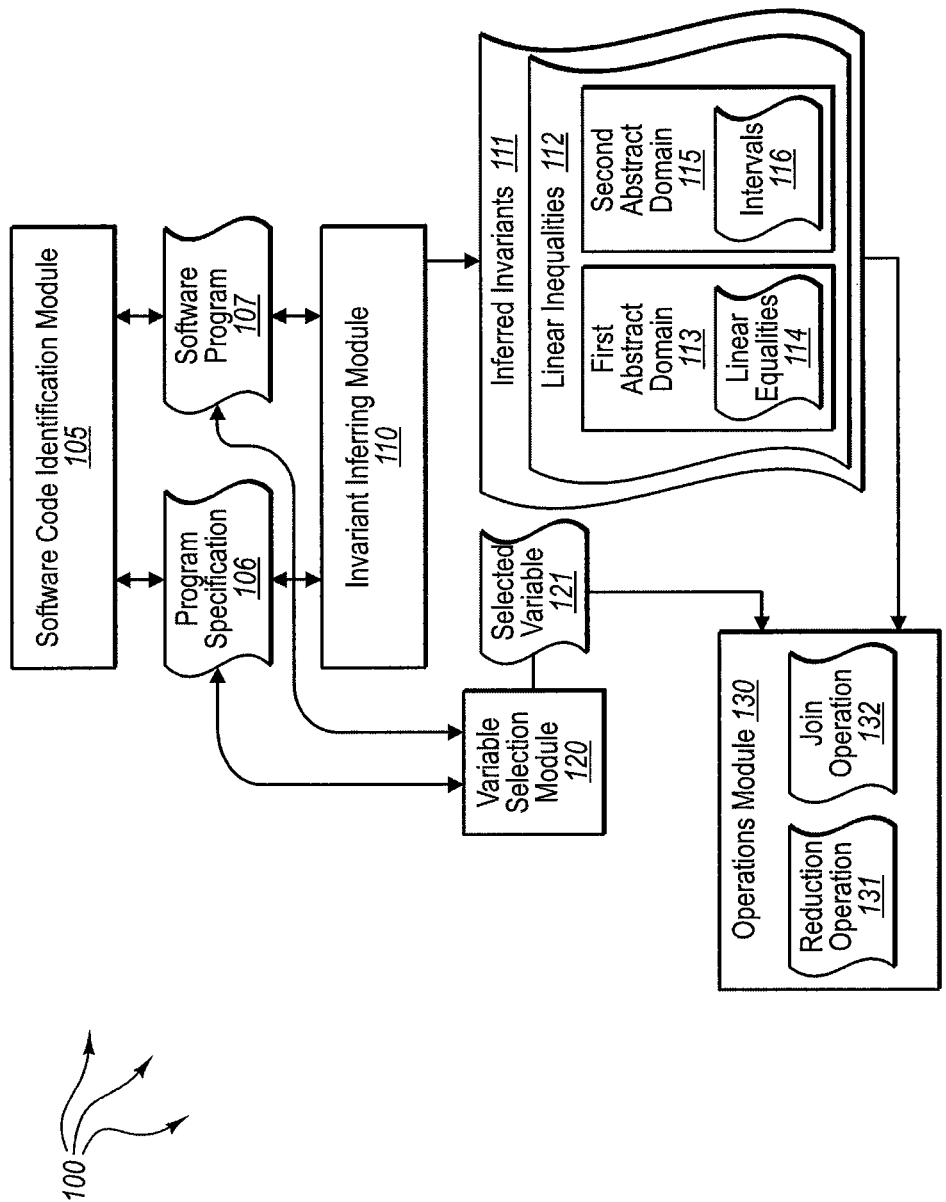
FIG. 1 illustrates a computer architecture in which embodiments of the present invention may operate including inferring invariants used to verify that a software program satisfies a program specification.

Embodiments described herein are directed to inferring invariants used to verify that a software program satisfies a program specification. In one embodiment, a computer system identifies a portion of software code that is to be verified using invariants. The invariants are at least partially inferred from the semantics of the software code portion and the invariants include linear inequalities. The computer system infers invariants from the software code portion at a join point. The linear inequalities of the invariants include a first abstract domain and a second, different abstract domain. The first abstract domain includes linear equalities among variables, and the second abstract domain including intervals for variables.

The computer system selects variables that are to be applied within the linear inequalities to form a linear equality and an interval based on the linear inequality. The computer system performs a reduction operation on the variables to determine the substantially tightest numerical bounds for the variable's interval, such that the most precise values for the linear equalities at the join point can be determined. The computer system also performs a join operation of the first and second abstract domains including the linear equality with the selected variable and the determined interval for the variable, where the join results in a precise abstraction of various possible software program states at the join point in the software program.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
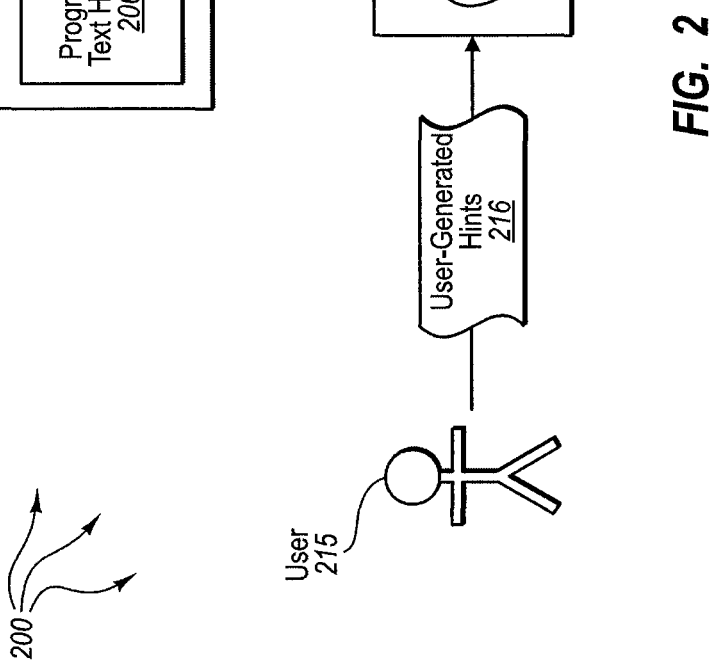
FIG. 2 illustrates an architecture in which hints may be generated or provided to the operations module.

FIG. 1 illustrates a computer architecture 100 in which the principles of the present invention may be employed. FIG. 2 illustrates an architecture 200 in which the principles of the present invention may be employed. As will be described below, methods, systems, computer program products and other means for inferring invariants may use either or both of architectures 100 and 200, independently or combined. Computer architecture 100 includes software program 107. Software program 107 may include any type of software application or portion thereof. Program 107 may include portions of software code such as modules, functions, or even individual lines of code. Software code identification module 105 may be configured to identify which portions of software program 107 are to be verified in a program verification process.

For example, a user or other automated system may determine that only a single function of program 107 is to be verified, or possibly a select few functions. Those functions may be verified to ensure that they are working properly and that no errors are apparent when compared to program specification 106. Specification 106 may include information indicating the desired or optimal outcome or result of program 107 (or the portion identified by module 105). Upon determining that, by executing software program 107 (or the identified portion thereof), the results match the specification, the program may be verified as being (substantially) error-free.

In some embodiments, program verification may be accomplished using program invariants. As used herein, program invariants may be described as expressions or statements that hold true upon execution of the program. The expressions or statements may be mathematical, logical, comparative (e.g. inequalities), or otherwise arranged. As such, invariants may be used to verify that an outcome of a function is the expected outcome, or at least that the outcome is not outside of an expected range of outcomes.

To determine proper invariants for a certain software program (or portion thereof, as selected by module 105), the invariants may be inferred from the software program's semantics. As will be explained in greater detail below, the inferred invariants 111 include one or more linear inequalities 112. Linear inequalities 112 include two abstract domains: first abstract domain 113 and second abstract domain 115. As used herein, abstract domains are used to capture the properties of interest in a particular program. Numerical abstract domains may be used to infer numerical relationships among program variables. These variables (e.g. selected variable 121) may be selected by variable selection module 120. Selected variables may be used to generate a more precise inferred invariant, as will be explained in greater detail below.

Operations module 130, which in some embodiments may include a wide variety of different performable operations, includes reduction operation 131 and join operation 132. The reduction operation may be used with selected variable(s) 121 to determine the substantially tightest bounds for the variable's interval (e.g. interval 116). In this manner, the most precise ranges for the linear equalities (e.g. 114) at a join point can be determined.

As used herein, an assertion point of a software program may include any point in the program where it may be desirable to verify the program. An assertion point may be selected by a user or by another software program. In some cases, an assertion point may comprise a join point. As used herein, a join point may include any part of the software program where the flow of the program merges. For instance, a join point may occur or be identified as the end of an "if" statement, a "while" statement, or other statement, or at the end of a loop. A join point may also occur at an exception, recursion, or other point of code convergence. Verifying a program at an assertion point includes inferring a precise invariant at a join point.

Operations module 130 may perform join operation 132 with the first abstract domain 113 and the second abstract domain 115 including linear equality 114 with selected variable 121 and interval 116 determined to be appropriate for the variable. Such a join operation may result in a precise abstraction of one or more possible software program states at a chosen join point in the software program. Operations 131 and 132 will be explained in greater detail below with regard to method 300 of FIG. 3.

Figure 3:
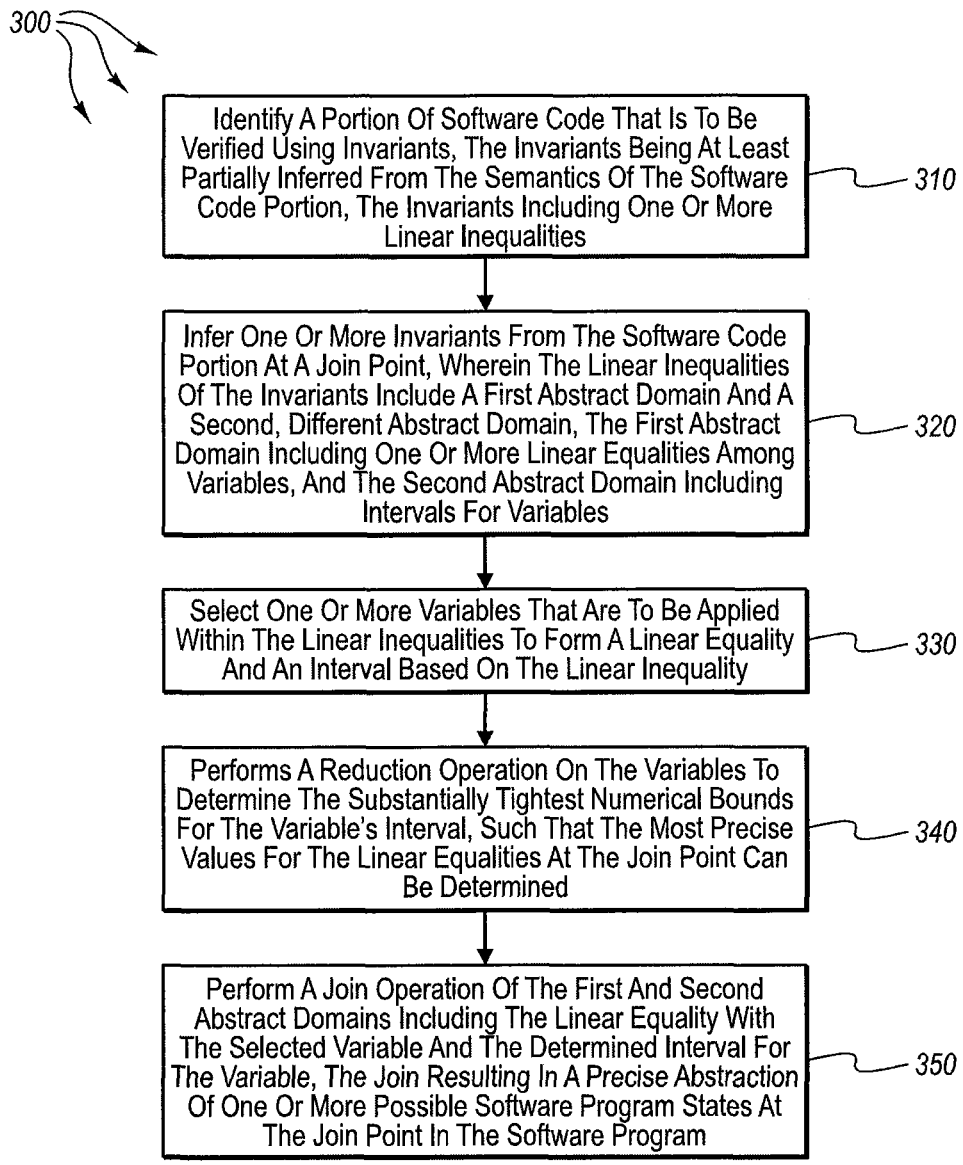
FIG. 3 illustrates a flowchart of an example method for inferring invariants used to verify that a software program satisfies a program specification.

FIG. 3 illustrates a flowchart of a method 300 for inferring invariants used to verify that a software program satisfies a program specification. The method 300 will now be described with frequent reference to the components and data of environments 100 of FIG. 1 and 200 of FIG. 2.

Method 300 includes an act of identifying a portion of software code that is to be verified using invariants, the invariants being at least partially inferred from the semantics of the software code portion, the invariants including one or more linear inequalities (act 310). For example, software code identification module 105 may identify a portion of software code (e.g. in software program 107) that is to be verified using invariants 111, where the invariants are at least partially inferred from the semantics of the software code portion and where the invariants include linear inequalities 112. Linear inequalities may take a variety of forms, as will be apparent to one skilled in the art. One very simplified example of a linear inequality is the following: $x+y+z \leq 0$.

Method 300 includes an act of inferring one or more invariants from the software code portion at a join point, wherein the linear inequalities of the invariants include a first abstract domain and a second, different abstract domain, the first abstract domain including one or more linear equalities among variables, and the second abstract domain including intervals for variables (act 320). For example, invariant inferring module 110 may infer invariants 111 from the identified software code portion at a join point. The linear inequality 112 of invariant 111 may include a first abstract domain 113 with a linear equality 114 and a second abstract domain 115 with an interval 116. Thus, continuing the above example, where inequality 112 is represented as $x+y+z \leq 0$, linear inequality 112 may be broken up into two different portions: linear equality $x+y+z=\beta$, in abstract domain 113, and interval $-\infty \leq \beta \leq 0$. Accordingly, in this embodiment, the variable $\beta$ is selected and used to form a linear equality. The same variable, $\beta$, is also used in the interval (116) and is bounded by the values of the interval. In this manner, a linear inequality can be represented using two different abstract domains. These domains may then be refined or widened as necessary, as will be explained further below.

In some embodiments, the cost of inferring invariants may be a polynomial function of the size of the program. Accordingly, because the cost of inferring invariants does not grow exponentially with the size of the program, invariants may be inferred in a software code portion with many hundreds, thousands or even more variables, and properly infer invariants without requiring an inordinate amount of processing power. In some cases, information identified and gathered at a join point may be used to infer other invariants. For example, information that is otherwise lost at a join point may be stored and referenced when inferring invariants. These inferred invariants 111 may be propagated to various portions of the software code, so that when the program is executed, the program can be verified at a single (or multiple different) assertion point(s) using the inferred invariants.

Method 300 includes an act of selecting one or more variables that are to be applied within the linear inequalities to form a linear equality and an interval based on the linear inequality (act 330). For example, variable selection module 120 may select selected variable 121 that is to be applied within linear inequalities 112 to form linear equality 114 and interval 116 based on linear inequality 112. Thus, as explained above, a variable $\beta$ may be introduced into linear inequality 112 to break up the inequality into two different portions (first and second abstract domains 113 and 115, respectively). Although only one variable is used in this example, it is possible that many different variables may be selected and used for one or multiple different linear inequalities.

In some cases, selected variable 121 may be a slack variable. Slack variables, as used herein, refer to variables that are added to an inequality to replace inequality constraints with equalities. Additionally, slack variables may be used to share information between the first and second domains. As in the above example, if $\beta$ were a slack variable, it could be used in both the linear equality and the interval, and could allow for information or values to be shared between the first and second domains.

Method 300 includes an act of performing a reduction operation on the variables to determine the substantially tightest numerical bounds for the variable's interval, such that the most precise values for the linear equalities at the join point can be determined (act 340). For example, operations module 130 may perform reduction operation 131 on selected variable 121 (e.g. $\beta$ as used in the above example), to determine the substantially tightest numerical bounds for interval 116, so that the most precise values for linear equality 114 at a given join point can be determined. Thus, if a developer or other software program tester wanted to verify program 107 at a predetermined or user-selected assertion point, operation module 130 could perform a reduction operation on the variables to discover the tightest possible values for the interval, and hence the most precise values for the linear equalities of inferred invariants 111 at the join point. By narrowing the interval, more potential values can be excluded, which reduces processing time after the interval has been determined. Narrower intervals also lead to more reliable and accurate program verification. Because many program paths can be excluded, each path does not need to be followed in the verification process, which conserves resources.

In some embodiments, as shown in FIG. 2, hints may be used to further refine the variable's interval. As used herein, the term hints refers to numerical values or other information used to establish more precise bounds for a variable's interval. Hints may be received from a user (e.g. user-generated hints 216 from user 215) or other computing system or program (e.g. generated hints 209 from hint generation module 205), accessed and used to narrow the numerical bounds of the variable's interval. In some cases, hints may be provided by a user in the form of software code annotations. For instance, the developer of software program 107 may indicate in program annotations or in program metadata that a certain variable can only have values within a given range. Thus, all other values for that variable can be safely excluded.

Hints may be automatically generated in a variety of different ways such as, for example, from a textual analysis of the software code. Automatic hint generation may include analyzing the software code within software program 107 to determine, based on the semantics of the code, appropriate values to use as hints (e.g. program text hints 206). Different types of hints such as template hints 207 may be used to recover linear inequalities or other information that is dropped during the join operation. Planar convex hull hints 208 may be generated by performing a planar convex hull operation at a selected join point. The convex hull operation may occur on a plane instead of in an arbitrary state. Other types of hints are also possible.

Any single hint or combination of hints may be used by operations module 230 in reduction operation 231 to establish more precise bounds for an interval that is to be subsequently used in join operation 232. It should be noted that operations module 230 may be the same as or different than operations module 130 in FIG. 1. Similarly, reduction operation 231 and join operation 232 may be the same as or different than reduction operation 131 and join operation 131 in FIG. 1, as the incorporation of hints may change or otherwise alter the functionality of these operations.

Method 300 includes an act of performing a join operation of the first and second abstract domains including the linear equality with the selected variable and the determined interval for the variable, the join resulting in a precise abstraction of one or more possible software program states at the join point in the software program (act 350). For example, operations module 130 may perform join operation 132 on first abstract domain 113 and on second abstract domain 115 including linear equalities 114 and intervals 116, respectively, for selected variable 121. The join operation results in a precise abstraction of various possible software program states at the selected join point(s) in program 107.

In some embodiments, join operation 132 may comprise a pairwise join operation, as it is generally understood in the art. The pairwise join may be performed on linear equality 114 of the first abstract domain and interval 116 of the second abstract domain, to result in a precise abstraction of possible software program states at a selected join point. After inferring one or more appropriate invariants and sufficiently narrowing the intervals for the variables, program 107 (or a selected portion thereof) may be verified using the inferred invariant(s) and program specification 106. Thus, it may be determined that the software program 107 satisfies program specification 106.

Accordingly, invariants may be inferred for a given portion of software code. The invariants may be inferred by discovering linear inequalities comprised of two different abstract domains that include linear equalities and intervals. Variables may be selected to be used in the linear equalities and the intervals, and reduction operations may be performed on the variables to determine the substantially tightest numerical bounds possible for the interval. In this manner, a linear equality paired with a numerical interval may be substituted for a linear inequality. The two abstract domains may be joined in a pairwise join, and the software code may be verified using the invariants inferred by the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system in a computer networking environment including a plurality of computing systems, a computerized method of inferring invariants used to verify that a software program satisfies a program specification, the method comprising the following acts:

identifying at a software code identification module a portion of a software program that is to be verified as meeting certain program specifications;

determining at an invariant inferring module one or more invariants for the identified portion of the software program that is to be verified, the one or more invariants being determined by inferring them at least in part from the software program's semantics, and each inferred invariant comprising a linear inequality which is represented in two parts using first and second abstract domains, the first part being represented in the first abstract domain as a linear equality, and the second part being represented in the second abstract domain as an interval based on the linear equality for a selected variable;

selecting at a variable selection module one or more variables that are applied to each linear inequality of an inferred invariant to form the linear equality and an interval based on the linear inequality for such inferred invariant;

performing at an operation module a reduction operation on the selected one or more variables to tighten numerical bounds for the interval of the second part of the linear inequality of each inferred invariant; and performing at the operation module a join operation on the first and second parts of the linear inequality for each inferred invariant, the join operation producing precise abstraction of one or more possible software program states which indicate whether the identified portion of the software program that is to be verified meets program specifications.

2. The method of claim 1, wherein the cost of inferring the invariants is a polynomial function of the size of the software program.

3. The method of claim 1, further comprising an act of storing one or more portions of additional information identified at a join point, wherein the information is usable in inferring invariants.

4. The method of claim 1, further comprising an act of propagating the inferred invariants to corresponding portions of the software code, such that the software program can be verified at a plurality of assertion points in the corresponding software code portions.

5. The method of claim 1, wherein one or more slack variables are used to share information between the first and second abstract domains.

6. The method of claim 1, further comprising an act of accessing one or more provided hints, such that the accessed hints are usable to narrow the numerical bounds of at least one interval.

7. The method of claim 6, wherein the hints are provided by a user in the form of software code annotations.

8. The method of claim 6, wherein the hints are automatically generated from a textual analysis of the software program.

9. The method of claim 6, wherein one or more template hints are used to recover linear inequalities that are dropped during the join operation.

10. The method of claim 6, wherein the hints are automatically generated by performing a planar convex hull operation at a join point.

11. The method of claim 1, wherein the join operation allows the verification to avoid exploring each variable such that scalability is increased.

12. A computer program product for implementing a computerized method of inferring invariants used to verify that a software program satisfies a program specification, the computer program product comprising one or more computer memory having stored thereon computer-executable instructions that, when executed by one or more processors of the computing system, cause the computing system to perform the computerized method, and wherein the computerized method is comprised of the following acts:

identifying, at a software code identification module a portion of a software program code that is to be verified as meeting certain program specifications;

determining at an invariant inferring module one or more invariants for the identified portion of the software program that is to be verified, the one or more invariants being determined by inferring them at least in part from the software program's semantics, and each inferred invariant comprising a linear inequality which is represented in two parts using first and second abstract domains, the first part being represented in the first abstract domain as a linear equality, and the second part being represented in the second abstract domain as an interval based on the linear equality for a selected variable;

selecting, at a variable selection module one or more variables that are applied to each linear inequality of an inferred invariant to form the linear equality and an interval based on the linear inequality, for such inferred invariant;

performing at an operation module a reduction operation on the selected one or more variables to tighten numerical bounds for the interval of the second part of the linear inequality of each inferred invariant;

receiving one or more hints, the hints being usable to further narrow the numerical bounds of the interval; and performing at the operation module a join operation on the first and second parts of the linear inequality for each inferred invariant, the join operation producing precise abstraction of one or more possible software program states which indicate whether the identified portion of the software program that is to be verified meets program specifications.

13. The computer program product of claim 12, wherein the hints are automatically generated from a textual analysis of the software program.

14. The computer program product of claim 12, wherein one or more template hints are used to recover linear inequalities that are dropped during the join operation.

15. The computer program product of claim 12, wherein the hints are automatically generated by performing a planar convex hull operation at a join point.

16. The computer program product of claim 12, wherein at least one or more variables comprise a slack variables, the slack variable being configured to share information between the first and second abstract domains.

17. The computer program product of claim 12, wherein the join operation allows the verification to avoid exploring each variable such that scalability is substantially increased.

18. A computer system comprising the following:

one or more processors;

system memory;

one or more computer-readable storage devices having stored thereon computer-executable instructions that, when executed by one or more processors of the computing system, cause the computing system to perform the computerized method, and wherein the computerized method is comprised of the following acts:

identifying at a software code identification module a portion of a software program that is to be verified as meeting certain program specifications;

determining at an invariant inferring module one or more invariants for the identified portion of the software program that is to be verified, the one or more invariants being determined by inferring them at least in part from the software program's semantics, and each inferred invariant comprising a linear inequality which is represented in two parts using first and second abstract domains, the first part being represented in the first abstract domain as a linear equality, and the second part being represented in the second abstract domain as an interval based on the linear equality for a selected variable;

selecting at a variable selection module one or more variables that are applied to each linear inequality of an inferred invariant to form the linear equality and an interval based on the linear inequality for such inferred invariant;

performing at an operation module a reduction operation on the selected one or more variables to tighten numerical bounds for the interval of the second part of the linear inequality of each inferred invariant; and performing at the operation module a join operation on the first and second parts of the linear inequality for each inferred invariant, the join operation producing precise abstraction of one or more possible software program states which indicate whether the identified portion of the software program that is to be verified meets program specifications.

\* \* \* \* \*